US011469895B2

(12) United States Patent
Shankar et al.

(10) Patent No.: US 11,469,895 B2
(45) Date of Patent: Oct. 11, 2022

(54) CLOUD TOKEN PROVISIONING OF MULTIPLE TOKENS

(71) Applicant: Visa International Service Association, San Francisco, CA (US)

(72) Inventors: Ramesh Shankar, San Francisco, CA (US); Sayeed Mohammed, Foster City, CA (US); Anjana Surin, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/294,125

(22) PCT Filed: Nov. 14, 2019

(86) PCT No.: PCT/US2019/061385
§ 371 (c)(1),
(2) Date: May 14, 2021

(87) PCT Pub. No.: WO2020/102484
PCT Pub. Date: May 22, 2020

(65) Prior Publication Data
US 2021/0359856 A1 Nov. 18, 2021

Related U.S. Application Data

(60) Provisional application No. 62/767,111, filed on Nov. 14, 2018.

(51) Int. Cl.
*H04L 9/32* (2006.01)
*H04L 9/30* (2006.01)
(Continued)

(52) U.S. Cl.
CPC ............ *H04L 9/3213* (2013.01); *H04L 9/302* (2013.01); *G06Q 20/322* (2013.01);
(Continued)

(58) Field of Classification Search
CPC ..... H04L 9/3213; H04L 9/302; G06Q 20/322; G06Q 20/367; G06Q 20/3821; G06Q 20/3829; G07C 9/00
See application file for complete search history.

(56) References Cited

U.S. PATENT DOCUMENTS 5,280,527 A   1/1994 Gullman
5,613,012 A   3/1997 Hoffman
(Continued)

FOREIGN PATENT DOCUMENTS

CN   104113549      10/2014
CN   104539701       4/2015
WO   2017209767 A1  12/2017

OTHER PUBLICATIONS

PCT/US2019/061385, "International Search Report and Written Opinion", dated Apr. 20, 2020, 13 pages.
(Continued)

*Primary Examiner* — Abu S Sholeman
(74) *Attorney, Agent, or Firm* — Kilpatrick Townsend & Stockton LLP

(57) ABSTRACT

A method is disclosed. The method includes receiving, by a token service computer, a token request message, the token request message being originated from a token requestor computer. The method also includes determining, by the token service computer, two or more access tokens based upon a single credential, and then transmitting the two or more access tokens to the token requestor computer in a token response message.

24 Claims, 7 Drawing Sheets

(51) Int. Cl.
  *G06Q 20/32* (2012.01)
  *G06Q 20/36* (2012.01)
  *G06Q 20/38* (2012.01)
  *G07C 9/00* (2020.01)

(52) U.S. Cl.
  CPC ....... *G06Q 20/367* (2013.01); *G06Q 20/3821* (2013.01); *G06Q 20/3829* (2013.01); *G07C 9/00* (2013.01)

(56) References Cited

U.S. PATENT DOCUMENTS

| | | | |
|---|---|---|---|
| 5,781,438 | A | 7/1998 | Lee |
| 5,883,810 | A | 3/1999 | Franklin |
| 5,930,767 | A | 7/1999 | Reber |
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,227,447 | B1 | 5/2001 | Campisano |
| 6,236,981 | B1 | 5/2001 | Hill |
| 6,267,292 | B1 | 7/2001 | Walker |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,453,301 | B1 | 9/2002 | Niwa |
| 6,592,044 | B1 | 7/2003 | Wong |
| 6,636,833 | B1 | 10/2003 | Flitcroft |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| 8,109,436 | B1 | 2/2012 | Hopkins, III |
| 8,121,942 | B2 | 2/2012 | Carlson |
| 8,121,956 | B2 | 2/2012 | Carlson |
| 8,126,449 | B2 | 2/2012 | Beenau |
| 8,132,723 | B2 | 3/2012 | Hogg et al. |
| 8,171,525 | B1 | 5/2012 | Pelly |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2 | 7/2012 | Carlson |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |
| 8,401,539 | B2 | 3/2013 | Beenau |
| 8,401,898 | B2 | 3/2013 | Chien |
| 8,402,555 | B2 | 3/2013 | Grecia |
| 8,403,211 | B2 | 3/2013 | Brooks |
| 8,412,623 | B2 | 4/2013 | Moon |
| 8,412,837 | B1 | 4/2013 | Emigh |
| 8,417,642 | B2 | 4/2013 | Oren |
| 8,447,699 | B2 | 5/2013 | Batada |
| 8,453,223 | B2 | 5/2013 | Svigals |
| 8,453,925 | B2 | 6/2013 | Fisher |
| 8,458,487 | B1 | 6/2013 | Palgon |
| 8,484,134 | B2 | 7/2013 | Hobson |
| 8,485,437 | B2 | 7/2013 | Mullen |

(56) References Cited

U.S. PATENT DOCUMENTS

| | | |
|---|---|---|
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 9,978,062 B2 | 5/2018 | Raj et al. |
| 9,996,835 B2 | 6/2018 | Dill et al. |
| 10,192,216 B2 | 1/2019 | Hammad |
| 10,313,321 B2 | 6/2019 | Wong |
| 10,496,986 B2 | 12/2019 | Narayan et al. |
| 10,607,212 B2 | 3/2020 | Sheets et al. |
| 10,887,275 B2 | 1/2021 | Wang |
| 11,068,889 B2 | 7/2021 | Al-Bedaiwi et al. |
| 11,086,980 B2 | 8/2021 | Le Saint et al. |
| 11,093,936 B2 | 8/2021 | Dill et al. |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0120211 A1* | 6/2005 | Yokoyama ............ G06F 21/335 |
| | | 713/168 |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |

(56) References Cited

U.S. PATENT DOCUMENTS

| | | |
|---|---|---|
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0266231 A1* | 10/2012 | Spiers .................. H04L 67/10 726/12 |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |

(56) References Cited

U.S. PATENT DOCUMENTS

| | | |
|---|---|---|
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1* | 1/2014 | Calman .............. G06F 21/6218 713/189 |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1* | 7/2015 | Palanisamy .......... G06Q 20/385 705/67 |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0019536 A1* | 1/2016 | Ortiz .................. G06Q 20/36 705/67 |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1* | 3/2016 | Guglani ............... H04W 12/08 726/26 |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0226879 A1* | 8/2016 | Chan .................. H04L 63/0815 |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0228728 A1 | 8/2017 | Sullivan |
| 2017/0236113 A1 | 8/2017 | Chitalia |
| 2017/0244688 A1* | 8/2017 | Kim .................... H04L 63/0861 |
| 2017/0293914 A1 | 10/2017 | Girish |
| 2017/0295155 A1 | 10/2017 | Wong et al. |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |

(56) References Cited

U.S. PATENT DOCUMENTS

| | | |
|---|---|---|
| 2019/0020478 A1 | 1/2019 | Girish |
| 2019/0066069 A1 | 2/2019 | Faith |
| 2019/0147439 A1 | 5/2019 | Wang |
| 2019/0188696 A1 | 6/2019 | Carpenter et al. |
| 2019/0356489 A1 | 11/2019 | Palanismy |
| 2019/0384896 A1 | 12/2019 | Jones |
| 2019/0392431 A1 | 12/2019 | Chitalila |
| 2020/0267153 A1 | 8/2020 | Kang |

OTHER PUBLICATIONS

Application No. CN201980074915.8 , Office Action, dated Sep. 22, 2021, 22 pages.
CN201980074915.8 , "Office Action", dated Mar. 1, 2022, 18 pages.
EP19885050.5 , "Extended European Search Report", dated Dec. 14, 2021, 11 pages.
SG11202104782T , "Written Opinion", dated Mar. 28, 2022, 10 pages.

* cited by examiner

CLOUD TOKEN PROVISIONING OF MULTIPLE TOKENS

CROSS-REFERENCES TO RELATED APPLICATIONS

This application is a National Stage of International Application No. PCT/US2019/061385, filed Nov. 14, 2019 which is claiming priority to U.S. Provisional Application No. 62/767,111, filed on Nov. 14, 2018, which are herein incorporated by reference in their entirety.

BACKGROUND OF THE INVENTION

Users can utilize tokens as substitutes for credentials in order to gain access to a service or product. During a transaction, a token on a mobile device can be exchanged for a real credential (e.g. a primary account number (PAN) or some other payment information) that can be used in a transaction authorization process. Using tokens ensures greater security of sensitive information by eliminating any real credentials from the mobile device.

In some processes, a user initially receives a token by sending a provisioning request from a mobile device. The token is bound to the mobile device and can be stored either within a secure element in the hardware of the mobile device or in the software where the security of the token can be ensured through the use of encryption.

However, binding a token to a single mobile device has limitations. For example, if a user wishes to exchange a current mobile device for a new mobile device, the user must repeat the provisioning process for the new mobile device by providing a PAN or some other credential to obtain a new token. The token on the user's previous mobile device is subsequently lost and cannot be transferred or used by the new mobile device.

Furthermore, a token cannot be shared by more than one device through this method. Any alternate mobile device(s) owned by a user requires a separate provisioning request, wherein a different token is generated for each individual mobile device. Since the credentials (e.g., a PAN) the user provides can be assumed to remain the same, these subsequent provisioning requests are generally redundant and a waste of computing resources.

Embodiments of the invention are directed to addressing these and other problems, individually and collectively.

BRIEF SUMMARY

Embodiments of the invention include provisioning multiple access tokens in response to a single token request message. In one embodiment, a method includes receiving, by a token requestor computer, an access credential from a mobile device operated by a user and transmitting the access credential to a token service computer. In response to receiving the access credential, the method also includes transmitting, by the token service computer, an authorization request message to an authorizing entity computer in order to verify credential eligibility. Upon receiving a positive authorization response message from the authorizing entity computer, the method additionally includes obtaining, by the token service computer, at least two or more tokens, wherein at least one token can be associated with the mobile device and at least one token can be associated with a cloud server computer. The generated tokens are transmitted within a token response message to the token requestor computer.

Another embodiment of the invention is directed to a method comprising: receiving, by a token service computer, a token request message, the token request message being originated from a token requestor computer; determining, by the token service computer, two or more access tokens based upon a single credential; and transmitting, by the token service computer, the two or more access tokens to the token requestor computer in a token response message.

Another embodiment of the invention is directed to a token service computer comprising: a processor; and a non-transitory computer readable medium, the non-transitory computer readable medium comprising code, executable by the processor to implement a method comprising: receiving a token request message, the token request message being originated from a token requestor computer; determining two or more access tokens based upon a single credential; and transmitting the two or more access tokens to the token requestor computer in a token response message.

Another embodiment of the invention is directed to a method comprising: receiving, by a token requestor computer from a communication device, a single credential; transmitting, by the token requestor computer, a token request message comprising the single credential to a token service computer; receiving, by the token requestor computer from the token service computer, a token response message comprising the two or more access tokens including a first access token and a second access token; transmitting, by the token requestor computer, the first access token to the communication device; and transmitting, by the token requestor computer, the second access token to a cloud server computer Another embodiment of the invention is directed to a token requestor computer comprising: a processor; and a non-transitory computer readable medium, the non-transitory computer readable medium comprising code, executable by the processor, for implementing a method comprising: receiving, from a communication device, a single credential; transmitting the single credential to a token service computer; receiving, from the token service computer, two or more access tokens including a first access token and a second access token; transmitting the first access token to the communication device; and transmitting the second access token to a cloud server computer Further details regarding embodiments of the invention can be found in the Detailed Description and the Figures.

DETAILED DESCRIPTION OF THE INVENTION

Figure 1:
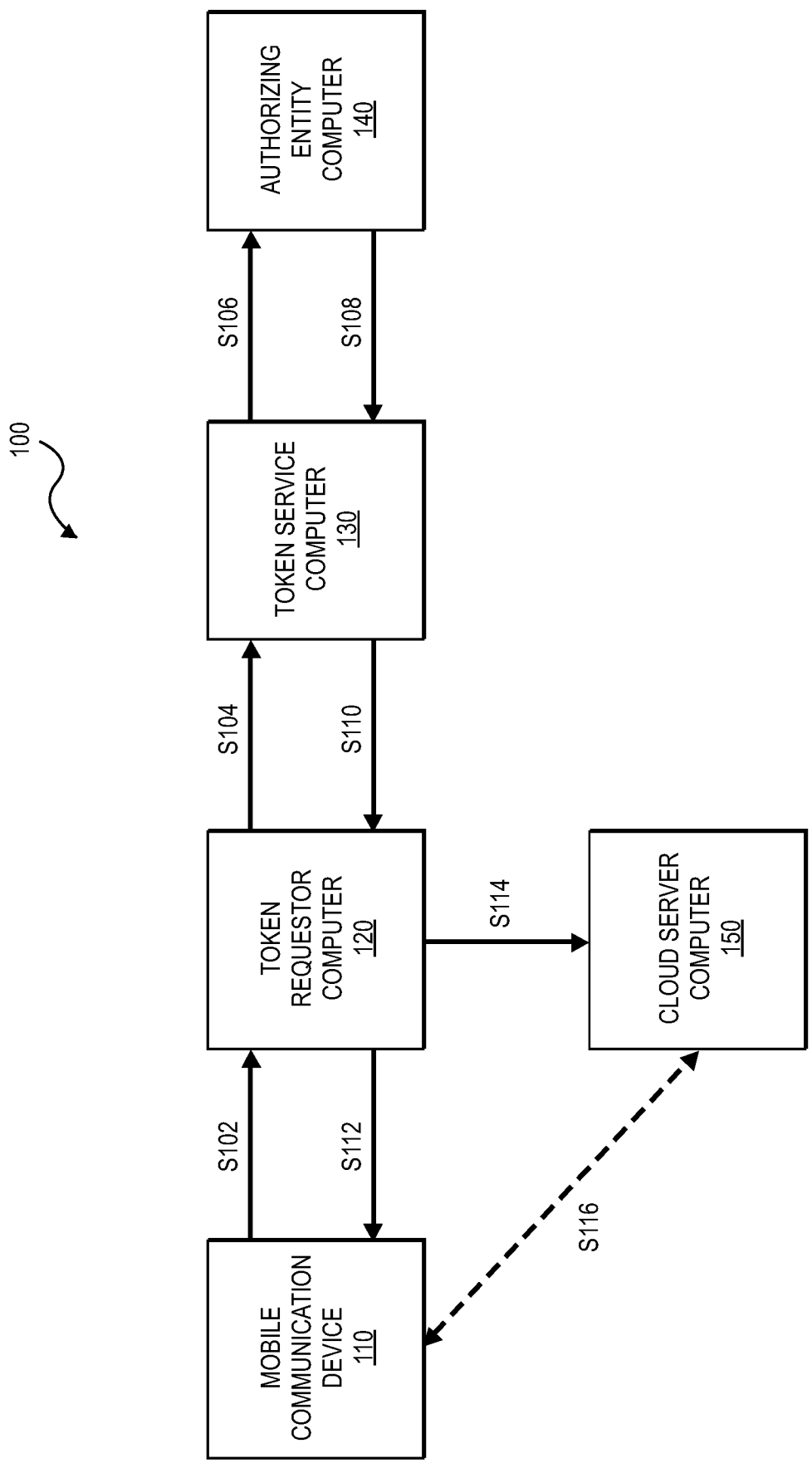
FIG. 1 shows a system and method for provisioning multiple tokens.

Prior to discussing embodiments of the invention, some terms can be described in further detail.

A "user device" may be any suitable device that can be used by a user. User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

"Authentication data" may include any data suitable for verifying something. Authentication data may include data authenticating a user or a mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "electronic wallet" or "digital wallet" can include an electronic device or service that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of a service provider includes merchants, digital wallets, payment processors, etc.

A "user" may include an individual or a computational device. In some embodiments, a user may be associated with one or more personal accounts and/or mobile devices. In some embodiments, the user may be a cardholder, account holder, or consumer.

A "token" may be a substitute value for a credential. An "access token" may be a token used to access something. A token may be a string of numbers, letters, or any other suitable characters. Examples of tokens include access tokens (e.g., payment tokens), personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token. In some embodiments, access tokens in embodiments can be 16, 18, or 19 characters long.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "authorization request message" may be an electronic message that requests authorization to do something. In some embodiments, an authorization request message is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, an authorization response message is generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "token service computer" may be any suitable device that handles, supervises, or manages token generation or token processing. A token service computer may be in communication with a token requestor computer, a processing network computer, an authorizing entity computer, or the like.

A "token request message" may be an electronic message that requests a token. In some embodiments, a token request message may comprise a token requestor identifier, and an address to a token service computer.

A "token response message" may be an electronic message reply to a token request message. A token response message may include at least one or more tokens, an address of the token requestor device requesting the token, etc.

A "cloud server computer" may be a remotely located server computer that comprises information or data that a user can access from at least one or more devices. A cloud server computer may either be a separate device or included within a larger device, and may be connected to a user device(s) through a network interface(e.g., to connect to a separate device over the internet) or any suitable communication interface.

A "requestor" may be an application, a device, or a system that is configured to perform actions associated with tokens. For example, a requestor can request registration with a network token system, request token generation, token activation, token de-activation, token exchange, other token life-cycle management related processes, and/or any other token related processes. A requestor may interface with a network token system through any suitable communication networks and/or protocols (e.g., using HTTPS, simple object access protocol (SOAP) and/or an extensible markup language (XML) interface). Some non-limiting examples of a requestor may include third party wallet providers, issuers, acquirers, merchants, and/or payment processing networks. A requestor may be referred to as a token requestor when requesting generation of a new token or requesting a new use of an existing token from a network token system. In some embodiments, a token requestor can request tokens for multiple domains and/or channels. Token requestors may include, for example, card-on-file merchants, acquirers, acquirer processors, and payment gateways acting on behalf of merchants, payment enables (e.g., original equipment manufacturers, mobile network operators, etc.), digital wallet providers, and/or card issuers.

A "token requestor identifier" (or token requestor computer identifier) may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

In some embodiments, a token requestor identifier may uniquely identify the pairing of a token requestor with a token domain. As such, in some embodiments, if a token requestor may request tokens for multiple domains, the token requestor may have multiple token requestor identifiers, one for each domain.

For example, in some embodiments, a token requestor identifier may include an 11 digit numeric value assigned by the network token system and the token requestor identifier may be unique within the token registry for each entity (and each domain). For instance, the token requestor identifier may include a code for a token service provider (e.g., first 3 digits) such as the network token system and the remaining digits (e.g., last 8 digits) may be assigned by the token service provider for each requesting entity (e.g., mobile wallet provider) and for each token domain (e.g., contactless, e-commerce, etc.).

Today, a mobile wallet on a communication device such as a mobile phone can provide a device bound token to a merchant application on the communication device. It can be adapted for use in both one-off and recurring use cases. The merchant application may then communicate with an application server associated with the merchant application to initiate a payment transaction using the token. If a user deletes the device bound token on their mobile wallet, any recurring transactions submitted by the merchant application will fail. Embodiments of the invention address this and other problems.

Embodiments of the invention can provide two or more access tokens to token requestor (e.g., a service provider computer such as a mobile wallet computer). The two or more access tokens may include, without limitation, a device bound token, and a cloud token. A "cloud token" may be token that is stored on a remote server computer and is used for remote access or remote transactions. In embodiments, a token requestor computer that is a mobile wallet server computer associated with a mobile wallet application on a communication device can request multiple tokens from a token service computer. The multiple tokens may comprise at least a cloud token and a device bound token. The token service computer can provide the cloud token to a cloud server computer operated by a merchant, via the token requestor computer, so that recurring transactions can be conducted on behalf of a user using the cloud token.

The cloud token can be based on the same PAN as a device token that is stored on the communication device, but is independent of the device token. A "device token" or "device bound token" may be a token that is used by the communication device which stores it in a proximity or contact transaction. Thus, while the cloud token is used to conduct remote transactions such as e-commerce transactions, a device token is used to conduct a transaction at a physical point of sale. If the device token is deleted (on purpose or accidentally), the cloud token is unaffected and recurring merchant transactions will continue to be processed. Embodiments avoid the need for the token requestor computer to make multiple calls to a token service computer to obtain multiple tokens from the token service computer.

FIG. 1 shows a system 100 according to one embodiment of the present invention. The system includes a mobile communication device 110 including a mobile wallet application, a token requestor computer 120 which may be operated by a token requestor such as a mobile wallet application server computer, a token service computer 130, an authorizing entity computer 140 such as an issuer computer operated by an issuer, and a cloud server computer 150. The cloud server computer 150 could be operated by a resource provider such as a merchant, or a mobile wallet provider. Each of the components shown in FIG. 1 may be in operative communication with each other.

The components in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Some embodiments allow for the provisioning of multiple tokens after receiving a single token request message. Referring back to FIG. 1, a token provisioning method can be described.

With reference to FIG. 1, in step S102, a mobile communication device 110 containing a mobile wallet application may provide an access credential (e.g., such as a PAN) to a token requestor computer 120, which may be a digital wallet server computer (e.g., such as Apple Pay or Samsung Pay or Android Pay, etc.).

In step S104, the token requestor computer 120 may generate and transmit a token request message comprising the access credential to a token service computer 130. The token request message may also comprise at least an address of the token service computer 130 and an identifier for the token requestor computer 120. The token service computer 130 can then perform an eligibility check on the access credential. For example, it can determine if the access credential is authentic before proceeding with the token provisioning process.

The eligibility check may occur in any suitable manner. For example, the token service computer 130 may check a blacklist to see if the access credential is present and/or may run a fraud check on the access credential using a fraud engine. In other embodiments, the token service computer 130 may transmit an eligibility request message to the authorizing entity computer 140. The authorizing entity computer 140 may perform the eligibility check, and may then provide an eligibility response message to the token service computer 130.

In step S106, after the token service computer 130 completes the eligibility check, and the access credential is determined to be eligible, the token service computer 130 can optionally transmit a provisioning request message to the authorizing entity computer 140. The provisioning request message may comprise the access credential and an address of the authorizing entity computer 140. A routing table may be present in the token service computer 130 which maps different access credentials to specific authorizing entity computers. The authorizing entity computer 140 may then determine if the access credential is authentic or is otherwise approved to have one or more tokens associated with it.

In step S108, the authorizing entity computer 140 may transmit a provisioning response message authorizing the provisioning to the token service computer 130. The provisioning response message may comprise an indication of whether or not the authorizing entity computer 140 approves of the provisioning.

In response to receiving the provisioning response message, the token service computer 130 can determine (e.g., generate or retrieve) two or more access tokens, and the two or more access tokens may be associated with the access credential. In some embodiments, the access tokens may be pre-generated, while in other embodiments, the access tokens can be derived from the supplied credential.

The two or more access credentials may have any suitable characteristics, and may eventually be used by a single user associated with the access credential in different situations. For example, in some embodiments, an access token may be a resource provider (e.g., merchant) specific token, while another access token may be a device specific token tied to a specific device such as a specific mobile phone operated by the user.

In some embodiments, the two or more access token are encrypted with a first symmetric cryptographic key before being transmitted to the token requestor computer 120. The token requestor computer 120 can decrypt the two or more access tokens with a second symmetric cryptographic key.

At step S110, a token response message including the two or more access tokens, and optionally the original real credential, may be transmitted to the token requestor computer 120. The token response message may also include information on a token type, where the token type determines whether an individual token will be stored on the mobile communication device 110 or a cloud server computer 150. The information on the token type may include token type indicators, which may indicate, for example, that a token is a cloud token for use with a cloud based transaction such as an e-commerce transaction, or that a token is a device bound token for use in a physical point of sale transaction. The token response message may also comprise cryptograms. A cryptogram may accompany a token in an authorization request message. The cryptogram may be validated by a processing computer, and validation of the cryptogram may indicate that the token is being used in a proper transaction channel.

At step S112, after receiving the token response message, the token requestor computer 120 may extract one access token from the token response message, wherein the extracted access token is determined by the token type, and may transmit the extracted access token to the mobile communication device 110 for storage in a memory structure (e.g., in a secure element) in the mobile communication device 110. In some embodiments, the token requestor computer 120 may encrypt the first access token using a public key in an RSA encryption scheme before transmitting the first access token to the mobile communication device 110. The first access token can be in encrypted form when the first access token is transmitted to the mobile communication device 110. The mobile communication device 110 stores a private key corresponding to the public key.

At S114, the token requestor computer 120 may extract another access token from the token response message, wherein the extracted access token is determined by the token type, and may provide the extracted access token to the cloud server computer 150. This access token may be stored in the cloud server computer 150 for later use by the user. For example, the access token stored in the cloud server computer 150 may be a merchant specific token that is used for recurring payment transactions such as recurring subscription payments for a newspaper.

The token requestor computer 120 may include a routing table which contains entries linking device identifiers and/or device addresses of devices (e.g., a cloud storage location on a cloud server computer) that are to be provisioned with access tokens, the real credentials, and token type indicators. The routing table may be used with the token response message is received. The token response message may include the real credential or other identifier, which may be used to identify the devices which are to be provisioned. The token type indicators may also be used to identify the specific types of devices to be provisioned (e.g., a mobile communication device or a cloud server).

In embodiments of the invention, the routing table may be populated with information during an enrollment phase with users, and/or can be populated with information as provisioning and transaction processes are conducted by the system.

Note that steps S112 and S114 can occur in any order, or sequentially in embodiments of the invention. Further, although this example describes the receipt of two access tokens by the token requestor computer 120, which distributes the two access tokens to two separate machines, in other embodiments, the token requestor computer 120 may receive three or more tokens in a single token response message and may distribute those three or more tokens to any number of machines. For example, the three or more tokens may be distributed to three or more machines, or two tokens may be distributed to one machine and one token may be distributed to another machine.

At step S116, the mobile communication device 110 may use a mobile wallet or other application (e.g., a resource provider or merchant specific application) to access the token stored by the cloud server computer 150 to conduct a transaction, as described below.

Embodiments have a number of advantages. In embodiments, two or more access tokens may be obtained in response to a single token request message. This reduces the time and the number of data transmissions associated with the receipt of access tokens, relative to conventional provisioning systems where only one access token per response message is received at a time.

Figure 2:
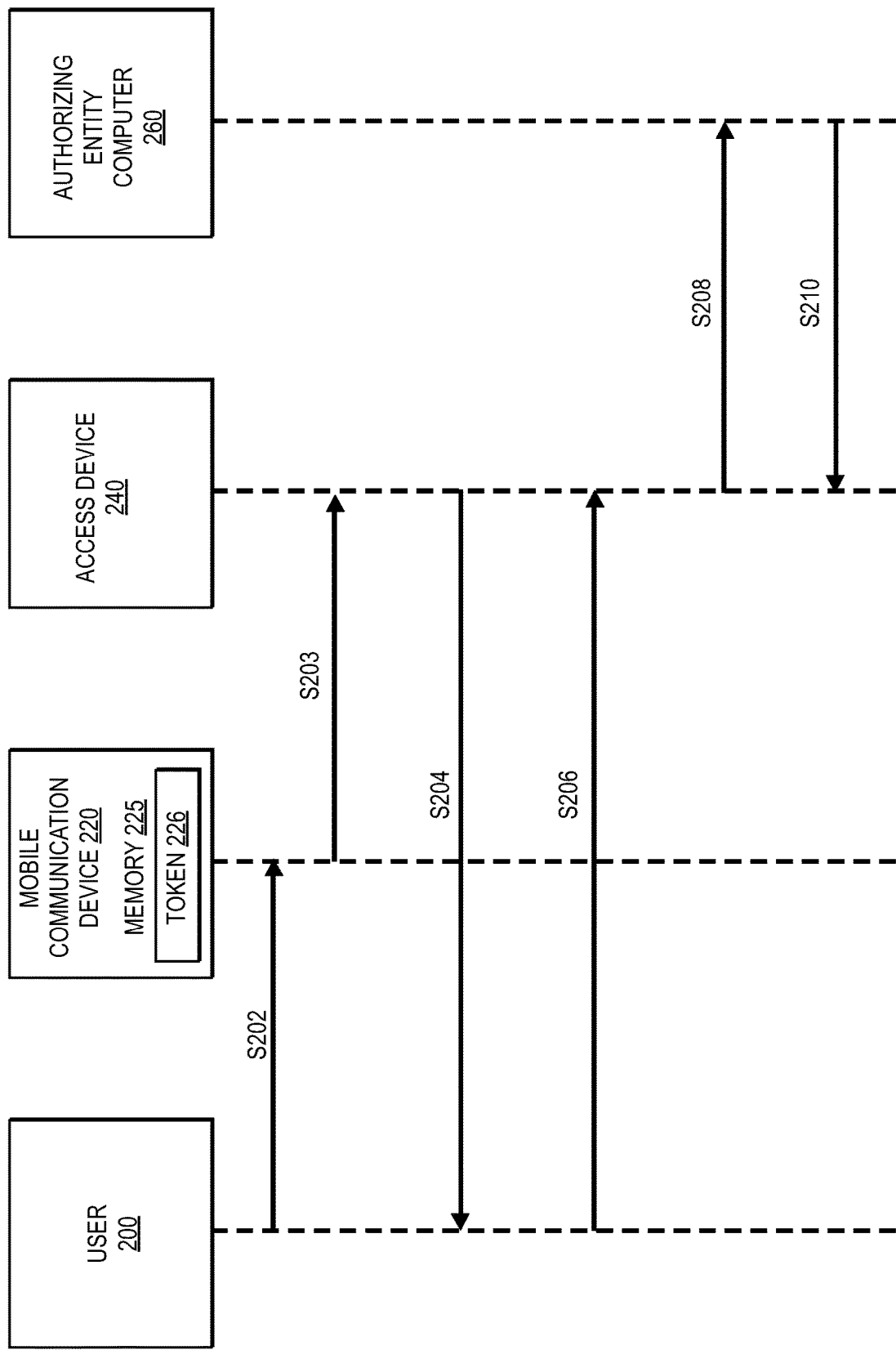
FIG. 2 shows a swim lane diagram illustrating a method for the retrieval and use of a device bound token, according to one embodiment of the invention.

Referring now to FIG. 2, a system for retrieving and using a device bound token for an in-app payment transaction is shown. In this system, a user 200 may operate a mobile communication device 220 with a device bound token 226 stored within a memory element 225.

In step S202, the user may initiate a payment within a mobile wallet or a merchant application on the mobile communication device 220. In some embodiments, the mobile wallet or merchant application may be Apple Pay, Samsung Pay, or Android Pay, and/or any application that requires an access token for completing a transaction and/or obtaining some service or product.

In step S203, the mobile communication device 220 may retrieve an appropriate device bound token 226 from a secure element and transmit the token 226 to an access device 240. The access device 240 may be a point of sale (POS) device, an automated teller machine (ATM), and/or any suitable device for communicating with the mobile communication device 220.

In step S204, the access device 240 may provide an authentication request to the user 200. The authentication request might require the user 200 to provide a PIN or some other user identifying data (e.g., a password, a biometric fingerprint and/or voice sample, etc.).

In step S206, the access device 240 may receive an authentication response with any requested authentication data. The access device 240 may validate the authentication data and generate a positive authentication indicator. If the authentication fails, then the access device 240 and/or mobile communication device 220 may display an error message and/or abort the transaction, such that the ensuing steps are not executed.

In step S208, the access device 240 may generate an authorization request message, and may then transmit the authorization request to an authorizing entity 260, optionally via a transport computer operated by an entity such an acquirer and a processing network computer operated by an entity such as a payment processing organization such as Visa™. The authorization request may include the device bound token 226 and/or one or more transaction details (e.g., such as a timestamp, a user ID, a requested amount, etc.). The authorizing entity 260 may determine if the amount requested is at least less than or equal to the user's available funds by communicating with an issuer. The authorizing entity computer 260 or a processing network computer (not shown in FIG. 2) that is in operative communication with the authorizing entity computer 260 may also exchange the device token 226 for a real credential (e.g., a PAN), before the authorizing entity computer 260 determines whether or not the transaction is authorized.

An authorization response is transmitted back to the access device 240 in step S210. The transaction may be completed upon receiving a positive authorization response. In the case of a negative authorization response, the access device 240 and/or mobile communication device 220 may display an error message and/or abort the transaction.

At the end of the day, a clearing and settlement process may take place between the authorizing entity computer 260, a processing network computer, and a transport computer associated with the resource provider (e.g., a merchant) of the access device 240.

Figure 3:
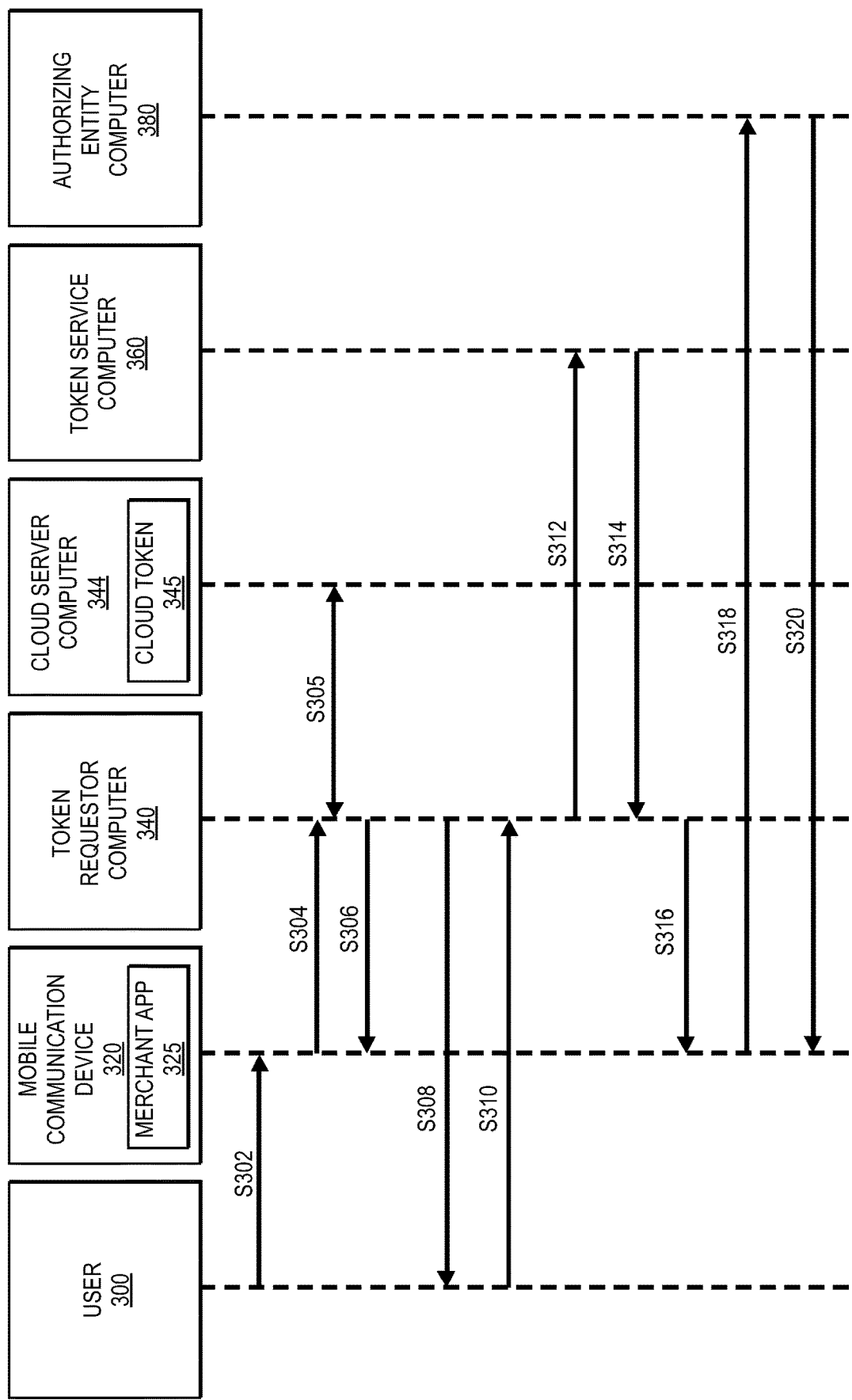
FIG. 3 shows a swim lane diagram illustrating the retrieval and use of a cloud token, according to some embodiments of the invention.

In some embodiments, a cloud token may be retrieved from a cloud server computer and used in a transaction as depicted in FIG. 3.

FIG. 3 shows a system and method for using a cloud token for an in app payment transaction. The system comprises a user 300 operating a mobile communication device 320 which may store an application such as a mobile wallet or, as shown in this instance, a merchant application 325. An application server computer (not shown) may be affiliated with the merchant application 325. The merchant application 325 may be affiliated with a token requestor computer 340, which may be a wallet server computer. A token service computer 360 may be in communication with both the token requestor computer 340 and an authorizing entity computer 380.

In step S302, a user 300 can initiate a payment in exchange for a product or service using the merchant application 325 on the mobile communication device 320. The merchant application 325 may be Apple Pay, Samsung Pay, or Android Pay, and/or any application that requires an access token for completing a transaction and/or obtaining some service or product.

In step S304, the merchant application 325 may send a cloud token request to the token requestor computer 340. The cloud token request could include a device bound token. The token request computer 340 may use a routing table that stores information associating the first access token (e.g., device bound token) with a location of a second access token (e.g., the location may be the location where a cloud token is stored on a cloud server computer 344) in order to determine the location of the corresponding cloud token 345. Using this location, the token requestor computer 340 can retrieve the correct cloud token 345 from the cloud server computer 344 as depicted in step S305. In step S306, the cloud token 345 may be transmitted, by the token requestor computer 340, to the merchant application 325 on the mobile communication device 320.

In steps S308 and S310, the token requestor computer 340 can authenticate the user 300. The authentication request might require the user 300 to provide a PIN or some other user identifying data (e.g., a password, a biometric fingerprint and/or voice sample, etc.). If the authentication fails or a negative authentication indicator is received, the token requestor computer 340 and/or mobile communication device 320 may display an error message and/or abort the transaction, such that the ensuing steps are not executed.

In steps S312 and S314, in response to a positive authentication response, the token requestor computer 340 may request an access cryptogram from the token service computer 360. The access cryptogram may be specifically associated with the particular cloud token 345 that will be used to conduct the transaction. For example, an access token that is tied to a device for use in in-store payments may require one specific cryptogram to be used. Another access token that is stored on file in a cloud computer may require another specific cryptogram for it to be used. The cryptogram can be a TAVV (transaction authentication verification value).

In step S316, the cryptogram and an access token from the token requestor computer 340 can then be provided to the merchant application 325.

In step S318, once the merchant application 325 has the cloud token 345 and the cryptogram, the merchant application (or an application provider in communication with the merchant application) may submit an authorization request message (e.g., via an acquirer and/or a payment processing network) to the authorizing entity computer 380. The authorizing entity computer 380, token service computer 360, a payment processor, or a payment processing network may verify the cryptogram, and can exchange the cloud token 345 for the real credential (e.g., a PAN) before the authorizing entity computer 380 makes a decision on the authorization request message.

The authorizing entity computer may then transmit an authorization response message (e.g., via a processing network computer in a payment processing network and a transport computer operated by an acquirer) back to the merchant application on the communication device 320. In step S320, the authorizing entity computer 380 may transmit an authorization response message back to the merchant application 325 on the mobile communication device 320, authorizing the transaction.

At the end of the day, a clearing and settlement process may take place between the authorizing entity computer 380, a processing network computer, and a transport computer operated by an acquirer of the merchant.

Figure 4:
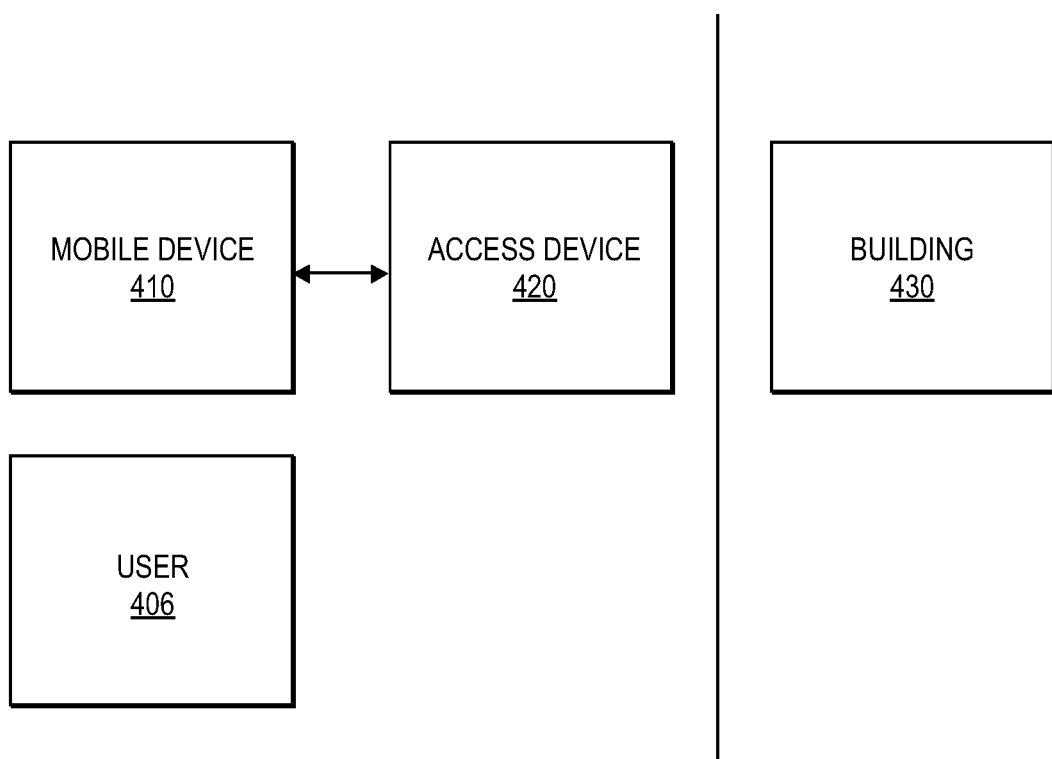
FIG. 4 shows a system for using a cloud token to gain access to a secure location, according to some embodiments of the invention.

FIG. 4 shows another embodiment of the invention. FIG. 4 shows a system and method for using a mobile communication device 410 to gain access to a building 430 (e.g. may refer to any secure location). In yet other embodiments, the building may be a secure server computer that houses secure data to be accessed (e.g., secure and private data records).

A user 406 can use a mobile communication device 410 to interact with an access device 420. The access device 420 may either retrieve a device bound token from the mobile communication device 410 or, in the absence of a device bound token, request a cloud token from a token requestor computer (as described in FIG. 3). The device bound token or the cloud token may be exchanged for a real credential (e.g., a PIN) which can be used to gain access to the building 430.

Embodiments of the present invention are useful in providing greater efficiency in the token provisioning process. For example, with reference to the system described in FIG. 4, a user 406 may be able to program (e.g., request a token) and use multiple mobile communication devices (e.g., a mobile phone and an access card) with a single provisioning request. Therefore, the user will only have to provide an access credential once in order to access a secure location with two or more devices (e.g., such as the aforementioned mobile phone and access card).

Figure 5:
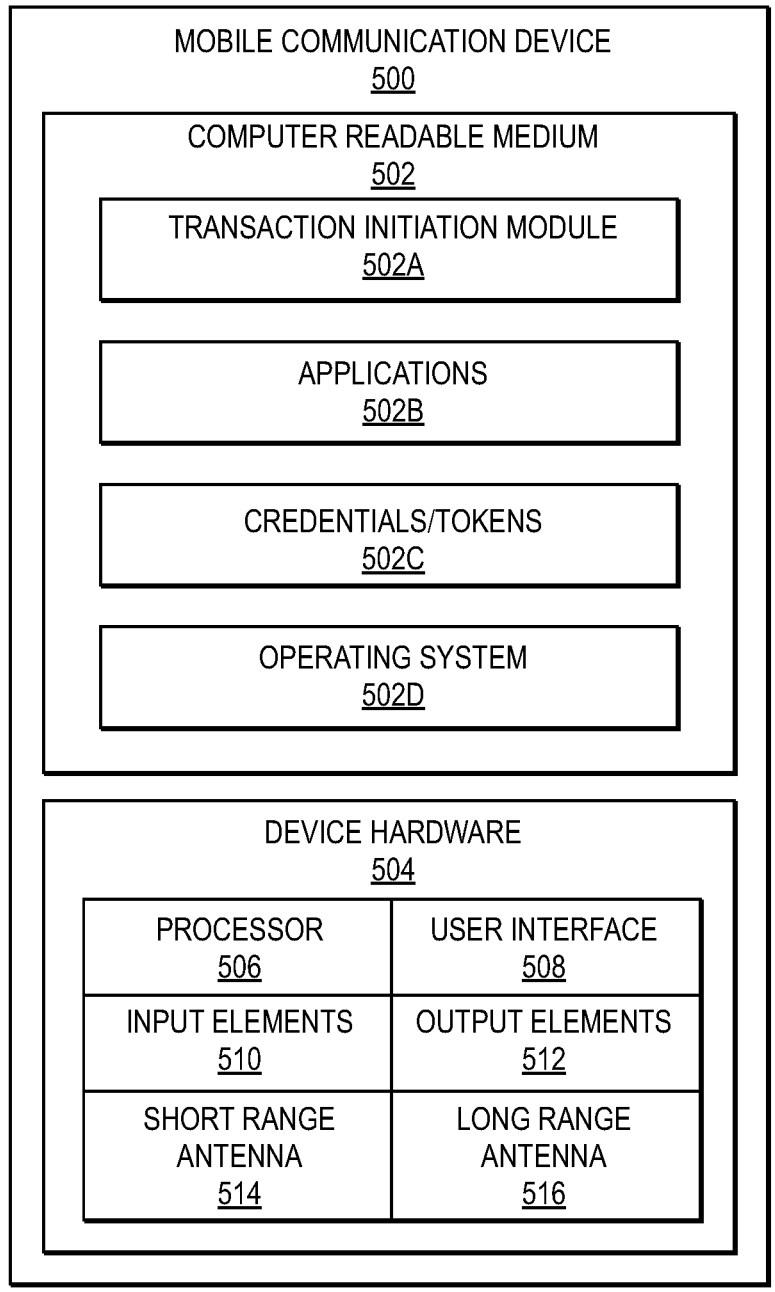
FIG. 5 shows a block diagram of a mobile communication device, in accordance with some embodiments of the invention.

FIG. 5 shows a block diagram of a mobile communication device 500 that can be used in embodiments of the invention. The mobile communication device 500 may be a mobile phone or an access card.

The mobile communication device 500 may comprise a computer readable medium 502, which can be in the form of (or may be included in) a memory element that stores data (e.g., merchant applications) and can be in any suitable form (e.g., microSD chip, SIM card, or other type of memory element). The computer readable medium 502 may store a transaction initiation module 502A, one or more applications 502B, real credentials and/or tokens 502C, and an operating system 502D for the device. The transaction initiation module 502A may begin a transaction at the request of a user or an application.

The computer readable medium 502 may also comprise a storage element 502B for device bound tokens and credentials. The token/credential storage 502B may be a secure memory element that is separate from the rest of the computer readable medium, such that tokens or credentials can only be accessed or altered by certain elements of the mobile communication device 500 and/or outside devices (e.g., a token requestor computer).

In addition, the mobile communication device 500 may include some device hardware 504, comprising: a processor 506, a user interface 508, input elements 510, output elements 512. The device hardware may also include a long range antenna 516 and a short range antenna 514 for communicating with a wireless network and/or other devices. All elements in the device hardware 504 are operatively coupled, enabling mutual communication and data transfer.

Figure 6:
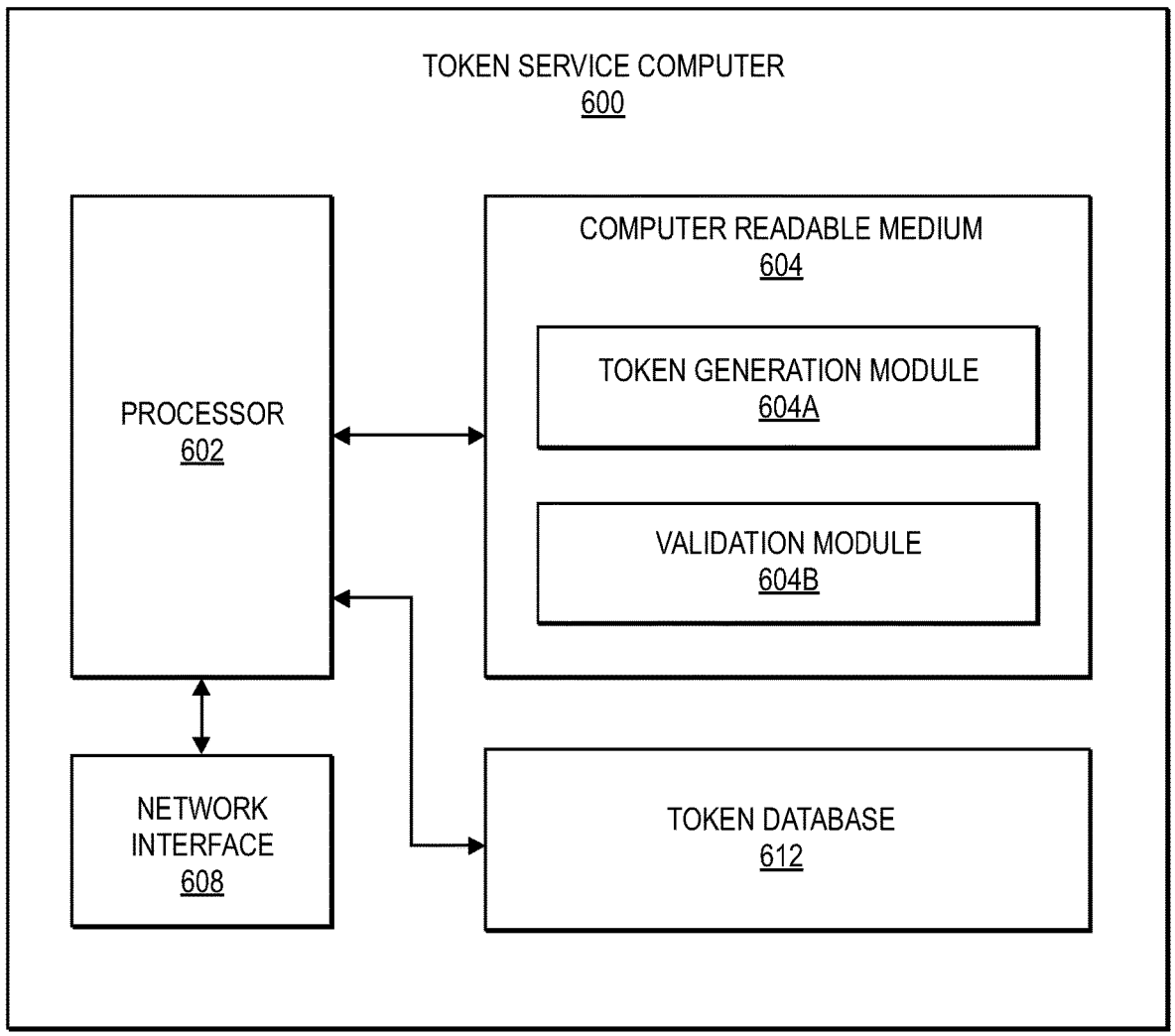
FIG. 6 shows a block diagram of a token service computer, in accordance with some embodiments of the invention.

Referring to FIG. 6, a block diagram of a token service computer 600 according to embodiments of the invention is illustrated. The token service computer 600 may include a processor 602, and a network interface 608 for receiving and transmitting messages (e.g. a token provisioning request message or token response message) to outside sources (e.g., an authorizing entity and/or the token requestor computer).

The token service computer 600 may include a non-transitory computer readable medium 604, comprising a token generation module 604A and a validation module 604B. The token generation module 604A may include code, executable by the processor 602 to generate or obtain at least two or more tokens from an access credential. However, this module may also be substituted for a token retrieval module, which connects the token service computer 600 to an outside database (e.g. issuer or authorizing entity) that can provide at least two or more tokens. The validation module 604B may be used, in conjunction with the processor 602, to determine the eligibility of an access credential.

The non-transitory computer readable medium 604 may comprise code, executable by the processor 602, for implementing a method comprising: receiving a token request message, the token request message being originated from a token requestor computer; determining two or more access tokens based upon a single credential; and transmitting the two or more access tokens to the token requestor computer in a token response message.

FIG. 6 also shows a token database 612 operatively coupled with the processor 602. The token database 612 may store tokens that are pre-generated, along with other token data such as mapping to real credentials, cryptograms, etc.

Figure 7:
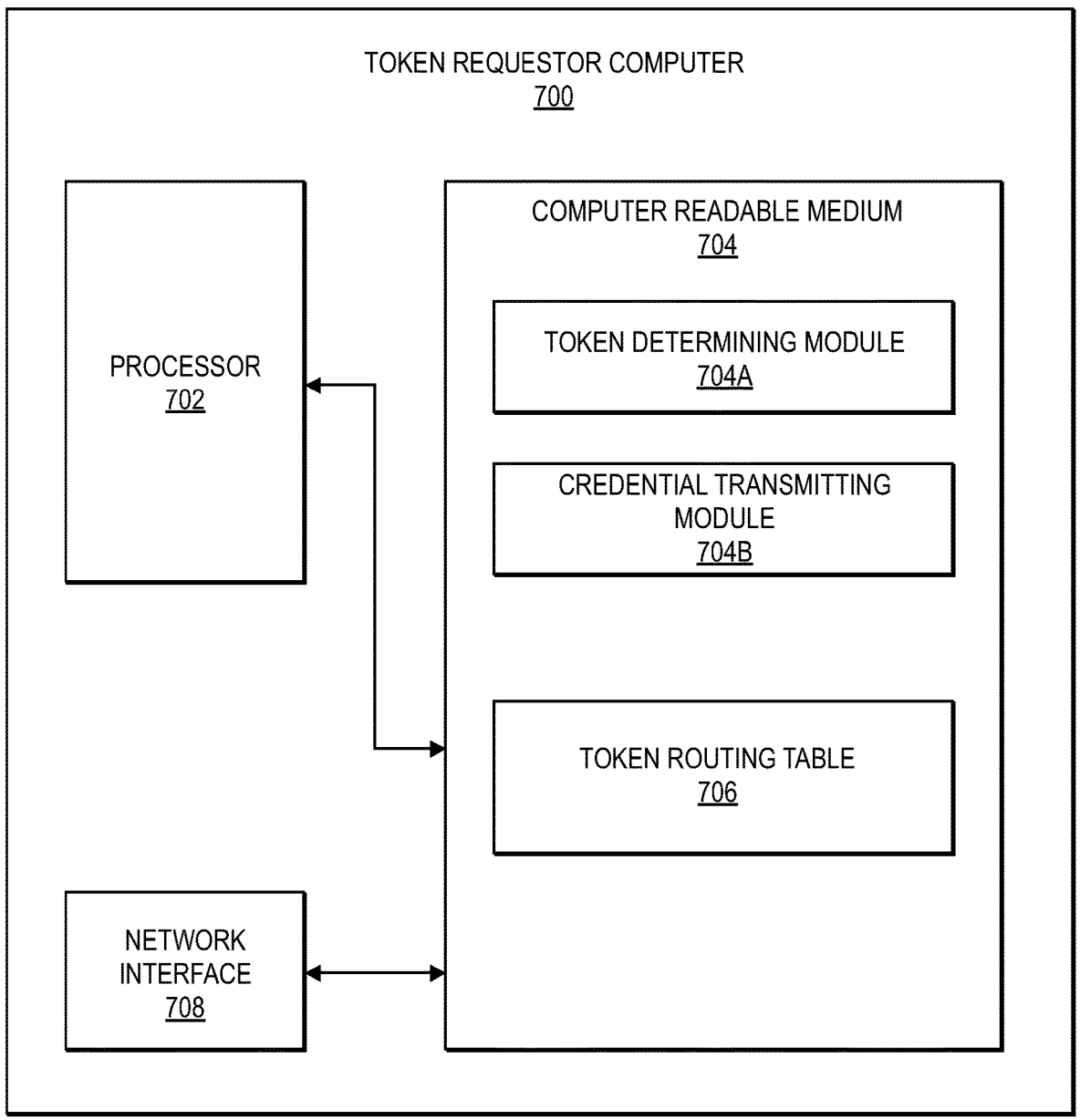
FIG. 7 shows a block diagram of a token requestor computer, in accordance with some embodiments of the invention.

FIG. 7 illustrates a block diagram of a token requestor computer 700 according to embodiments of the invention.

The token requestor computer 700 may also include a processor 702 and a network interface 708 for receiving and transmitting messages (e.g., a token response message) with the token service computer and cloud server computer.

The token requestor computer 700 may include a non-transitory computer readable medium 704, comprising a token determining module 704A and a credential transmitting module 704B. The token determining module 704A may, in conjunction with the processor 702, use a token type indicator to determine sending a first access token to a mobile communication device and a second access token to a cloud server computer. The credential transmitting module 704B may, in conjunction with the processor 702, handle generating or receiving an access credential from a mobile communication device operated by a user and transmitting the access credential to a token service computer in order to request at least two or more access tokens.

The non-transitory computer readable medium 704 may comprise code, executable by the processor, for implementing a method comprising: receiving, from a communication device, a single credential; transmitting the single credential to a token service computer; receiving, from the token service computer, two or more access tokens including a first access token and a second access token; transmitting the first access token to the communication device; and transmitting the second access token to a cloud server computer.

The token requestor computer 700 may include a routing table 706 that stores relationships between a location of a first access token (e.g., a communication device operated by a user), and a secondary location of a second access token (e.g. a cloud storage location on a cloud server computer). The routing table 706 may be accessed to retrieve an appropriate cloud token for a user.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a token service computer, a token request message, the token request message comprising a single credential from a token requestor computer, after the token requestor computer receives the single credential from a mobile communication device;
determining, by the token service computer, two or more access tokens based upon the single credential; and
transmitting, by the token service computer, a single token response message comprising the two or more access tokens to the token requestor computer, wherein the two or more access tokens comprise a cloud token and a device specific token for the mobile communication device that is associated with the token requestor computer, wherein the cloud token is a first payment token and the device specific token is a second payment token, the first payment token and the second payment token being substitutes for the single credential, the single credential being an account identifier, and
wherein the token requestor computer transmits the second payment token to the mobile communication device and the token requestor computer provides the first payment token to a cloud server computer.

2. A method comprising:
receiving, by a token service computer, a token request message, the token request message being originated from a token requestor computer;
determining, by the token service computer, two or more access tokens based upon a single credential, wherein the two or more access tokens comprise a cloud token and a device specific token; and
transmitting, by the token service computer, a single token response message comprising the two or more access tokens to the token requestor computer, wherein the token requestor computer comprises a routing table that stores relationships between a communication device operated by a user, and a cloud storage location on a cloud server computer, wherein the cloud token is a first payment token and the device specific token is a second payment token, the first payment token and the second payment token being substitutes for the single credential, the single credential being an account identifier.

3. The method of claim 2, wherein the routing table also stores token type indicators associated with the first payment token to be stored in the communication device, and the second payment token to be stored in the cloud storage location on the cloud server computer.

4. A token service computer comprising:
a processor; and
a non-transitory computer readable medium, the non-transitory computer readable medium comprising code, executable by the processor to implement a method comprising:

receiving a token request message, the token request message being originated from a token requestor computer;

determining two or more access tokens based upon a single credential, wherein the two or more access tokens comprise a cloud token and a device specific token; and transmitting a token response message comprising the two or more access tokens to the token requestor computer, wherein the two or more access tokens are each assigned a token type indicator upon generation, wherein the cloud token is a first payment token and the device specific token is a second payment token, the first payment token and the second payment token being substitutes for the single credential, the single credential being an account identifier.

5. A method comprising:

receiving, by a token requestor computer from a communication device, a single credential;

transmitting, by the token requestor computer, a token request message comprising the single credential to a token service computer;

receiving, by the token requestor computer from the token service computer, a token response message comprising two or more access tokens including a first access token and a second access token;

transmitting, by the token requestor computer, the first access token to the communication device; and transmitting, by the token requestor computer, the second access token to a cloud server computer, wherein the first access token is a first payment token and the second access token is a second payment token, the first payment token and the second payment token being substitutes for the single credential, the single credential being an account identifier.

6. The method of claim 5, wherein the single credential is a real credential.

7. The method of claim 5, further comprising:

encrypting, by the token requestor computer, the first access token using a public key in an RSA encryption scheme before transmitting the first access token to the communication device, the first access token being in encrypted form when the first access token is transmitted to the communication device, the communication device storing a private key corresponding to the public key.

8. The method of claim 5, wherein the token requestor computer comprises a routing table that stores relationships between the communication device operated by a user, and a cloud storage location on the cloud server computer.

9. The method of claim 8, wherein the token requestor computer uses the routing table to retrieve the second payment token.

10. The method of claim 5, wherein the token request message also comprises a token requestor computer identifier.

11. The method of claim 5, wherein destinations of the two or more access tokens are determined by token type indicators.

12. The method of claim 11, wherein the token type indicators include at least a type for device bound tokens and a type for cloud tokens.

13. A token requestor computer comprising:

a processor; and a non-transitory computer readable medium, the non-transitory computer readable medium comprising code, executable by the processor, for implementing a method comprising:

receiving, from a communication device, a single credential;

transmitting a token request message comprising the single credential to a token service computer;

receiving, from the token service computer, a token response message comprising two or more access tokens including a first access token and a second access token;

transmitting the first access token to the communication device; and transmitting the second access token to a cloud server computer, wherein the first access token is a first payment token and the second access token is a second payment token, the first payment token and the second payment token being substitutes for the single credential, the single credential being an account identifier.

14. The method of claim 13, wherein the single credential is sixteen digits long.

15. The token requestor computer of claim 13, wherein the first access token is used by the communication device to access a secure location.

16. The token requestor computer of claim 13, wherein the non-transitory computer readable medium comprises a token determining module and a credential transmitting module.

17. The token requestor computer of claim 13, comprising a routing table that stores relationships between the communication device operated by a user, and a cloud storage location on the cloud server computer.

18. The token requestor computer of claim 17, wherein the routing table can be used to retrieve the second payment token.

19. The token requestor computer of claim 17, wherein the routing table also stores token type indicators associated with the first payment token to be stored in the communication device, and the second payment token to be stored in the cloud storage location on the cloud server computer.

20. The token requestor computer of claim 13, wherein destinations of the two or more access tokens are determined by token type indicators.

21. The token requestor computer of claim 20, wherein the token type indicators may include at least a type for device bound tokens and a type for cloud tokens.

22. The token requestor computer of claim 13, wherein the token request message comprises a token requestor computer identifier.

23. The method of claim 1, wherein the first payment token and the second payment token are each sixteen digits long.

24. The method of claim 5, wherein the account identifier is a primary account identifier.

* * * * *